3,389,845
DEVICE FOR ULTRASONIC WELDING OF THE KIND COMPRISING A CONVERTOR AND AN AMPLITUDE TRANSFORMER
Henricus Petrus Cornelis Daniels, Emmasingel, Eindhoven, Netherlands, assignor to North American Philips Company, Inc., New York, N.Y., a corporation of Delaware
Filed June 9, 1966, Ser. No. 556,366
Claims priority, application Netherlands, June 25, 1965, 6508149
4 Claims. (Cl. 228—1)

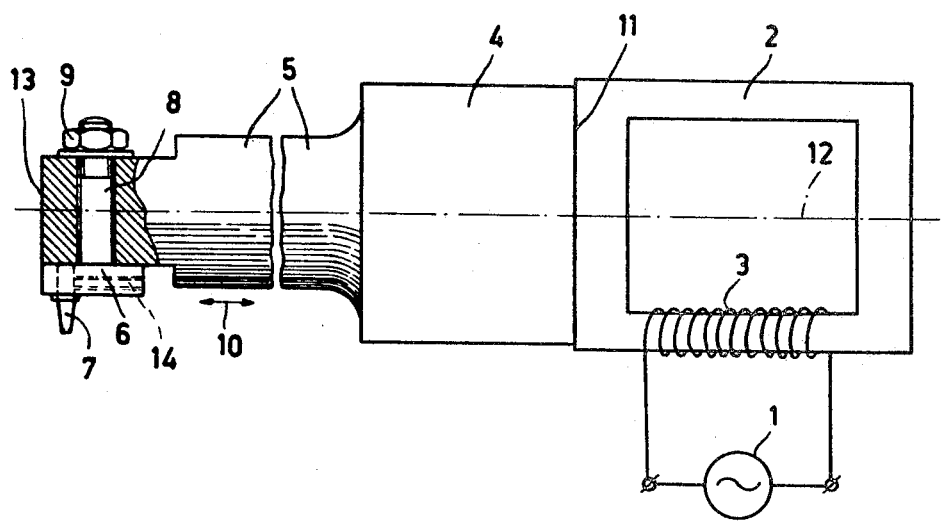

The invention relates to a device for ultrasonic welding comprising a convertor which converts the electrical energy of an alternating-voltage source into mechanical energy, an amplitude transformer which raises the amplitude of the mechanical vibrations produced by the convertor and a welding tip which is disposed at the end of the transformer remote from the convertor and which transfers the mechanical energy to the welding area.

In a known device of the aforementioned kind, the welding tip is rigidly secured to the transformer. The welding tip forms part, for example, of a cone which is inserted into the transformer body and which is fixed by pushing the cone with great force into the body so that a satisfactory contact is established between the cone and the transformer. The transformer generally consists of an aluminum alloy which is comparatively cheap and which ensures a substantially loss-free transmission of mechanical vibrations. A frequently used alloy contains a few percent of Cu, approximately 1% of Pb and approximately 1% of Mg. If the welding tip and the cone also consists of this aluminium alloy, the energy transfer to the welding tip is effected satisfactorily. Aluminium and aluminium alloys have the disadvantage, however, that they have a low resistance to wear. Use is therefore generally made of a welding tip of wear-resistant material, for example, titanium. In this case, however, the ultrasonic waves incident on the interface between aluminium and titanium are reflected. Consequently, the ratio between the energy absorbed by the welding tip and the energy supplied by the ultrasonic generator decreases.

The invention has for its object to obviate this disadvantage and is characterised in that the welding tip is inserted into a plate which is mechanically connected with the transformer, while the interface between the plate and the transformer, which are made of different materials, extends parallel to the direction of the mechanical vibrations of the transformer.

The plate is preferably constituted by the head of a bolt which projects through the transformer body, while the welding tip is fixed in the head.

The invention is based on the recognition of the fact that the reflection at the boundary faces extending parallel to the direction of propagation of a wave is negligible.

The invention will now be described with reference to the drawing, which shows a device for ultrasonic welding in accordance with the invention.

The drawing shows diagrammatically an ultrasonic welding device. A coil 3 is wound on a core of the convertor 2 consisting of piezo-magnetic material. Electric oscillations of a comparatively high frequency, for example, 20 kc./s. are supplied from the source 1 to the coil 3. The electric oscillations are converted into mechanical vibrations of the piezo-magnetic material. The amplitude of the mechanical vibrations produced at the interface 11 is imparted to the amplitude transformer 4, 5. The vibrations are performed in the direction of the axis 12 (axial or longitudinal vibrations). The part 5 has a much smaller cross-section than the part 4 which adjoins the convertor 2. The amplitude of the longitudinal vibrations is much greater at the end face 13 than at the separation face 11, since the cross-section of the part 5 extending transversely of the direction of the vibrations is much smaller than that of the part 4. It should be noted that each of the parts 4 and 5 has a length equal to a quarter wave length of the mechanical vibrations.

According to the invention, provision is made at the end face 13 of a plate 6, the boundary face between this plate and the part 5 of the transformer being comparatively large. The welding tip 7 is secured in the plate 6 with the aid of an adjusting screw 14. The plate 6 is in turn tightly pressed against the part 5 of the amplitude transformer. For this purpose, the plate has the shape of the head of a bolt 8 which projects through the part 5. The nut 9 ensures that the plate 6 is pressed against the part 5 in the desired manner. The plate 6 consists, for example of titanium, while the transformer 4, 5 is made of aluminum. The bolt 8, the nut 9 and the welding tip 7 are preferably made of the same material as the plate 6.

It is desirable to choose the mass of the nut 9 to be approximately equal to that of the plate 6 in order to avoid harmful transverse vibrations of the end face of the transformer.

In a device in accordance with the invention, the ratio between the energy absorbed by the welding tip and that supplied by the generator was found to be at least twice that in the known device.

Instead of using nut and bolt, the plate 6 may alternatively be connected with the part 5 of the transformer by means of cement. In order to avoid transverse vibrations, a thickened part must be provided on the transformer opposite the plate.

Alternatively, a plurality of plates each provided with a welding tip may be arranged on the transformer symmetrically to the axis 12. These plates may be held together, for example, by means of a ribbon.

What is claimed is:
1. A device for ultrasonic welding comprising a convertor which converts the electrical energy of an alternating-voltage source into mechanical energy, an amplitude transformer which raises the amplitude of the mechanical vibrations produced by the convertor and a welding tip which is disposed at the end of the transformer remote from the convertor and which transfers the mechanical energy to the welding area, characterized in that the welding tip is inserted into a plate which is mechanically connected with the transformer, while the interface between the plate and the transformer, which are made of different materials, extends parallel to the direction of the mechanical vibrations of the transformer.
2. A device as claimed in claim 1, characterized in that the plate is constituted by the head of a bolt which projects through the transformer body, while the welding tip is fixed in the head.
3. A device as claimed in claim 1, characterized in that opposite the plate the transformer is provided with a thickened part having approximately the same mass as the plate.
4. A device as claimed in claim 1, characterized in that a plurality of plates each provided with a welding tip are arranged on the transformer symmetrically to its axis.

References Cited
UNITED STATES PATENTS
3,302,277    2/1967    Druden _____ 228—1 X RICHARD H. EANES, JR., *Primary Examiner.*